(12) United States Patent
Choi et al.

(10) Patent No.: US 10,425,897 B2
(45) Date of Patent: Sep. 24, 2019

(54) METHOD AND DEVICE FOR CONTROLLING TRANSMISSION POWER IN WIRELESS COMMUNICATION SYSTEM USING MULTIPLE ANTENNAS

(71) Applicant: Samsung Electronics Co., Ltd., Suwon-si, Gyeonggi-do (KR)

(72) Inventors: Seung-Hoon Choi, Seongnam-si (KR); Youn-Sun Kim, Seongnam-si (KR); Young-Woo Kwak, Suwon-si (KR); Hoon-Dong Noh, Suwon-si (KR); Dong-Han Kim, Osan-si (KR); Young-Bum Kim, Seoul (KR); Jeong-Ho Yeo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 10 days.

(21) Appl. No.: 15/563,806

(22) PCT Filed: Apr. 8, 2016

(86) PCT No.: PCT/KR2016/003748
§ 371 (c)(1),
(2) Date: Oct. 2, 2017

(87) PCT Pub. No.: WO2016/163832
PCT Pub. Date: Oct. 13, 2016

(65) Prior Publication Data
US 2018/0084502 A1 Mar. 22, 2018

Related U.S. Application Data

(60) Provisional application No. 62/145,207, filed on Apr. 9, 2015, provisional application No. 62/161,398, filed on May 14, 2015.

(51) Int. Cl.
*H04W 52/02* (2009.01)
*H04B 7/04* (2017.01)
(Continued)

(52) U.S. Cl.
CPC .......... *H04W 52/0245* (2013.01); *H04B 7/04* (2013.01); *H04B 7/0426* (2013.01);
(Continued)

(58) Field of Classification Search
CPC ............. H04W 52/0245; H04W 52/42; H04B 7/0608; H04B 7/0456; H04B 7/0426; H04B 7/06; H04B 7/04; H04B 7/0626
See application file for complete search history.

(56) References Cited

U.S. PATENT DOCUMENTS

2011/0280330 A1* 11/2011 Tanaka ................... H04B 7/024
375/267
2013/0215992 A1 8/2013 Kazmi et al.
(Continued)

FOREIGN PATENT DOCUMENTS

KR 10-2014-0144261 A 12/2014
WO 2014/099346 A1 6/2014

OTHER PUBLICATIONS

European Search Report dated Feb. 6, 2018, issued in European Patent Application No. 16776935.5-1219.

*Primary Examiner* — Afshawn M Towfighi
(74) *Attorney, Agent, or Firm* — Jefferson IP Law, LLP

(57) ABSTRACT

The present invention relates to a 5G or pre-5G communication system for supporting a higher data transmission rate beyond a 4G communication system such as LTE and, more particularly, to a method and a device for controlling transmission power, the method being performed in a base station of a wireless communication system using multiple antennas. The method for controlling transmission power com-
(Continued)

prises the step of: transmitting a reference signal at a plurality of vertical angles that differ from each other by means of an antenna arrangement; receiving channel state information, which is related to beamforming of a transmission signal, from a terminal which has received the reference signal and measured a channel state; and transmitting the transmission signal to the terminal by means of transmission power which corresponds to the channel state information.

18 Claims, 10 Drawing Sheets

(51) Int. Cl.
  *H04B 7/06* (2006.01)
  *H04W 52/42* (2009.01)
  *H04B 7/0426* (2017.01)
  *H04B 7/0456* (2017.01)

(52) U.S. Cl.
  CPC .............. *H04B 7/0456* (2013.01); *H04B 7/06* (2013.01); *H04B 7/0608* (2013.01); *H04W 52/42* (2013.01); *H04B 7/0626* (2013.01); *Y02D 70/00* (2018.01); *Y02D 70/10* (2018.01); *Y02D 70/12* (2018.01); *Y02D 70/126* (2018.01); *Y02D 70/1262* (2018.01); *Y02D 70/21* (2018.01)

(56) References Cited

U.S. PATENT DOCUMENTS

| | | |
|---|---|---|
| 2013/0258964 A1 | 10/2013 | Nam et al. |
| 2014/0192917 A1* | 7/2014 | Nam .................... H04B 7/0417 375/267 |
| 2014/0198663 A1 | 7/2014 | Xu et al. |
| 2015/0029875 A1* | 1/2015 | Zhu ........................ H04W 4/70 370/252 |
| 2015/0092684 A1 | 4/2015 | Cheng et al. |

* cited by examiner

METHOD AND DEVICE FOR CONTROLLING TRANSMISSION POWER IN WIRELESS COMMUNICATION SYSTEM USING MULTIPLE ANTENNAS

CROSS-REFERENCE TO RELATED APPLICATION(S)

This application is a U.S. National Stage application under 35 U.S.C. § 371 of an International application filed on Apr. 8, 2016 and assigned application number PCT/KR2016/003748, which claimed the benefit of U.S. Provisional Patent Application No. 62/145,207 filed on Apr. 9, 2015, and of U.S. Provisional Patent Application No. 62/161,398 filed on May 14, 2015, each of which are incorporated herein by reference into the present disclosure as if fully set forth herein.

TECHNICAL FIELD

The present disclosure relates to a method and apparatus for controlling transmission power in a wireless communication system, and more particularly, to a method and apparatus for controlling transmission power in a wireless communication system using multiple antennas.

BACKGROUND ART

To satisfy demands for wireless data traffic having increased since commercialization of $4^{th}$-Generation (4G) communication systems, efforts have been made to develop improved $5^{th}$-Generation (5G) communication systems or pre-5G communication systems. For this reason, the 5G communication system or the pre-5G communication system is also called a beyond-4G-network communication system or a post-Long Term Evolution (LTE) system.

To achieve a high data rate, implementation of the 5G communication system in an ultra-high frequency (mm-Wave) band (e.g., a 60 GHz band) is under consideration. In the 5G communication system, beamforming, massive multi-input multi-output (MIMO), full dimensional MIMO (FD-MIMO), an array antenna, analog beamforming, and large-scale antenna technologies have been discussed to alleviate a propagation path loss and to increase a propagation distance in the ultra-high frequency band.

For system network improvement, in the 5G communication system, techniques such as an evolved small cell, an advanced small cell, a cloud radio access network (RAN), an ultra-dense network, a device to device (D2D) communication, a wireless backhaul, a moving network, cooperative communication, coordinated multi-points (CoMPs), and interference cancellation have been developed.

In the 5G system, advanced coding modulation (ACM) schemes including hybrid frequency-shift keying (FSK) and quadrature amplitude modulation (QAM) modulation (FQAM) and sliding window superposition coding (SWSC), and advanced access schemes including filter bank multi carrier (FBMC), non-orthogonal multiple access (NOMA), and sparse code multiple access (SCMA) have been developed.

Current wireless communication systems are evolving to high-speed, high-quality wireless packet data communication systems to provide data services and multimedia services beyond the initial versions that have provided voice-centered services. To this end, various standardization organizations, such as the 3rd-Generation Partnership Project (3GPP), the 3GPP2, and the Institute of Electrical and Electronics Engineers (IEEE), are preparing 3G evolution mobile communication system standards employing multiple access schemes using multi-carriers. Recently, various mobile communication standards, including Long Term Evolution (LTE) of the 3GPP, Ultra Mobile Broadband (UMB) of the 3GPP2, and 802.16m of the IEEE, have been developed in order to support a high speed-high quality wireless packet data transmission service based on a multiple access scheme using a multi-carrier.

Existing 4G evolution mobile communication systems, such as LTE, UMB, and 802.16m, are based on multi-carrier multiple access schemes, employ multiple input multiple output (MIMO) schemes to improve transmission efficiency, and use various technologies, such as beamforming, adaptive modulation and coding (AMC), channel sensitive scheduling, and the like. The aforementioned techniques increase system capacity performance through transmission efficiency improvement achieved by collecting transmission power from various antennas depending on channel quality, etc., adjusting the amount of transmission data, selectively transmitting data to a user having good channel quality, and so forth. Because of mostly operating based on channel state or status information between an evolved NodeB (eNB) (or a base station (BS)) and a user equipment (UE) (or a mobile station (MS)), these schemes need to measure a channel state or status between the eNB and the UE, and for this end, a channel status indication reference signal (CSI-RS) is used. The eNB means a downlink transmission and uplink reception apparatus located in a predetermined place, and one eNB performs transmission and reception with respect to a plurality of cells. In a wireless communication system are geographically distributed a plurality of eNBs, each of which performs transmission and reception with respect to a plurality of cells.

The existing 4G wireless communication systems such as LTE/LTE-A use the MIMO technique that performs transmission using a plurality of transmission and reception antennas to expand a data rate and a system capacity. The MIMO technique performs transmission by spatially dividing a plurality of information streams using a plurality of transmission and reception antennas. As such, transmission based on spatial division of the plurality of information streams is referred to as spatial multiplexing. Generally, the number of information streams to which spatial multiplexing is applicable depends on the number of antennas of each of a transmitter and a receiver. The number of information streams to which spatial multiplexing is applicable is defined as a rank of transmission. For MIMO techniques supported by standards up to LTE/LTE-A Release 11, spatial multiplexing is supported for 8 transmission/reception antennas and a maximum of 8 ranks are supported.

The recent 4G evolution wireless communication system standards such as the 3GPP LTE(-A) or the IEEE 802.16m mostly employ multiple access schemes using multiple subcarriers such as orthogonal full dimension (FD) multiplexing (multiple access) (OFMD(A)) as multiple access schemes. Spatial multiplexing that improves frequency efficiency by using MIMO that performs transmission and reception using multiple antennas, together with a multiple access scheme based on multiple subcarriers, is used for wireless communication. In a wireless communication system supporting multiple antennas, efficient transmission power control is one of important technical issues.

DETAILED DESCRIPTION OF THE INVENTION

Technical Problem

The present disclosure provides an efficient transmission power control method and apparatus in a wireless communication system using multiple antennas.

The present disclosure also provides a method and apparatus for controlling transmission power based on an angle of an antenna in a wireless communication system using multiple antennas.

Moreover, the present disclosure provides a transmission power control method and apparatus for reducing an influence of interference upon a neighboring cell in a wireless communication system using multiple antennas.

Technical Solution

A transmission power control method performed by an eNB of a wireless communication system using multiple antennas according to an embodiment of the present disclosure includes transmitting a reference signal at a plurality of different vertical angles through an antenna array, receiving channel state information related to beamforming of a transmission signal from a UE having received the reference signal and having measured a channel state, and transmitting the transmission signal to the UE with a transmission power corresponding to the channel state information.

An eNB of a wireless communication system using multiple antennas according to an embodiment of the present disclosure includes a transceiver comprising an antenna array and a controller configured to transmit a reference signal at a plurality of different vertical angles through the antenna array, to receive channel state information which is related to beamforming of a transmission signal, from a UE having received the reference signal and measured a channel state, and to transmit the transmission signal to the UE with a transmission power corresponding to the channel state information.

A transmission power control method performed by a UE of a wireless communication system using multiple antennas according to an embodiment of the present disclosure includes receiving a reference signal (RS) transmitted at a plurality of different vertical angles through an antenna array of an eNB, receiving the RS to measure a channel state and transmitting channel state information related to beamforming of a transmission signal to be transmitted from the eNB, and receiving the transmission signal from the eNB with a transmission power corresponding to the channel state information.

A UE of a wireless communication system using multiple antennas according to an embodiment of the present disclosure includes a transceiver configured to transmit and receive data and a controller configured to receive a reference signal transmitted at a plurality of different vertical angles through an antenna array of an eNB, to receive the reference signal and measure a channel state, to transmit channel state information which is related to beamforming of a transmission signal to be transmitted from the eNB, and to receive the transmission signal from the eNB with a transmission power corresponding to the channel state information.

MODE FOR CARRYING OUT THE INVENTION

Figure 1:
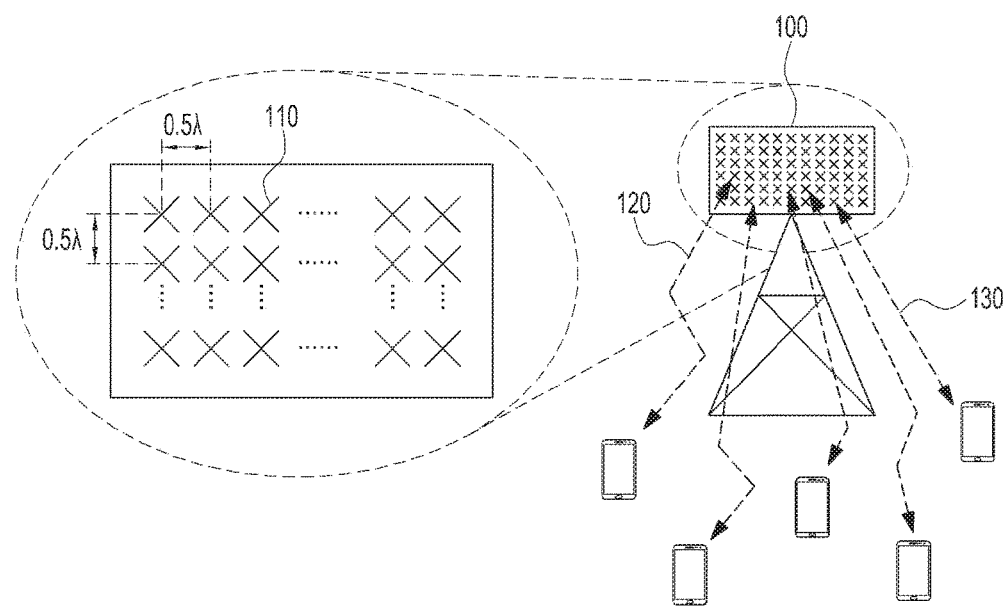
FIG. 1 illustrates an example of a frequency division-multiple input multiple output (FD-MIMO) system to which power control according to an embodiment of the present disclosure is applied.

Hereinafter, embodiments of the present disclosure will be described in detail with reference to the accompanying drawings. Moreover, a detailed description of well-known functions or elements associated with the present disclosure will be omitted if it unnecessarily obscures the subject matter of the present disclosure. Further, the terminologies to be described below are defined in consideration of functions in the present disclosure and may vary depending on a user's or operator's intention or practice. Therefore, the definitions should be made based on the contents throughout the entire description of the present disclosure.

In addition, when embodiments of the present disclosure are described in detail, a wireless communication system using multiple antennas based on multiple input multiple output (MIMO) will be described. A main subject matter of the present disclosure is also applicable with some modifications to other communication systems having a similar technical background and a similar channel form without significantly departing from a range disclosed herein, as will be possible based on determination of those of ordinary skill in the art.

Recently, as a new technique related to multiple antennas, standardization of full-dimension (FD) MIMO has been launched in the 3GPP. The FD-MIMO enables beamforming where a transmitter may adjust a signal transmission direction using transmission antennas arranged two-dimensionally. That is, the transmitter adopting FD-MIMO may control a vertical angular direction and a horizontal angular direction of a transmission signal. When the transmission direction of the signal is adjustable both in the vertical direction and in the horizontal direction, the transmitter may transmit the transmission signal more effectively based on a reception location, thereby innovatively improving the performance of a wireless communication system.

When FD-MIMO using a two-dimensional (2D) antenna array is applied to a multi-cell wireless communication system, overall system performance may be largely improved. In particular, if FD-MIMO is applied to an evolved NodeB (eNB) (or a base station), the eNB may provide an efficient wireless communication service to a user equipment (UE) (or a mobile station). When FD-MIMO is applied to an eNB, there is a difference than an eNB adopting MIMO in a sense that a signal from the eNB employing FD-MIMO may be transmitted in various vertical angular directions. The eNB employing MIMO may control only a horizontal angular direction of a transmission signal. To control the vertical angular direction of the transmission signal, FD-MIMO needs to be used based on an influence of interference upon a neighboring cell in a wireless communication system. This is because, generally, as a vertical angle of the transmission signal from the eNB approaches horizontal, interference affecting a neighboring cell increases. The present disclosure provides a method for providing an efficient wireless communication service by controlling an influence of FD-MIMO that performs transmission in various vertical angular directions upon neighbors. As an example of a system to which a power control method according to an embodiment of the present disclosure is applicable, an FD-MIMO system, evolving from an existing LTE/LTE-A MIMO technique, may use 32 or more transmission antennas beyond 8 transmission antennas. That is, the FD-MIMO system refers to a wireless communication system that transmits data by using several tens of transmission antennas or more. Hereinbelow, an LTE or LTE-A technique will be referred to as LTE in brief. Furthermore, while embodiments of the present disclosure will be described based on an FD-MIMO system as an example for convenience, it should be noted that the present disclosure is not limited to the FD-MIMO system. The embodiments of the present disclosure are also applicable to various wireless communication systems using multiple antennas capable of adjusting an angle of a transmission signal.

FIG. 1 illustrates an example of an FD-MIMO system to which power control according to an embodiment of the present disclosure is applied.

Referring to FIG. 1, an eNB transmission equipment 100 transmits a radio signal through several tens of transmission antennas or more. The plurality of transmission antennas are arranged to have a minimum distance therebetween as indicated by 110. An example of the minimum distance may equal a half of a wavelength of a radio signal to be transmitted. Generally, when a distance equaling a half of a wavelength of a radio signal is maintained between transmission antennas, a signal transmitted through each transmission antenna is affected by a radio channel having a low correlation. If a band of a radio signal to be transmitted is 2 GHz, the distance may be about 7.5 cm, and if the band is higher than 2 GHz, the distance becomes shorter than 7.5 cm.

In FIG. 1, the transmission antennas of the eNB are located in a two-dimensional (2D) antenna array as in 100. Such arrangement of transmission antennas on a 2D plane allows the eNB to adjust beamforming of a transmission signal in the vertical direction and in the horizontal direction at the same time. This is different from an existing one-dimensional (1D) antenna array of transmission antennas where beamforming may be controlled either in the vertical direction or in the horizontal direction.

In FIG. 1, several tens of or more transmission antennas arranged in the eNB transmission equipment 100 are used to transmit a signal to one UE or plural UEs as indicated by 120. Proper precoding is applied to a plurality of transmission antennas for simultaneous signal transmission to the plurality of UEs. In this case, one UE may receive one or more spatially separated information streams. Generally, the number of information streams one UE may receive is determined according to the number of reception antennas of the UE and a channel status.

To effectively implement the FD-MIMO system, the UE has to accurately measure a channel status and the magnitude of interference and transmit effective channel state or status information to the eNB by using the measurement results. The BS having received the channel state information determines, in relation to downlink transmission, UEs to which transmission is to be performed, a data rate at which transmission is to be performed, and precoding to be applied. Since the FD-MIMO system has a large number of transmission antennas, an uplink overhead occurs in which a lot of control information has to be transmitted in the uplink if a conventional method for transmitting and receiving channel state information of an LTE/LTE-A system is used.

In a wireless communication system, time, frequency, and power resources are limited. Thus, if more resources are allocated to a reference signal (RS), resources allocable to data transmission in a traffic channel are reduced, resulting in reduction of the absolute amount of transmission data. In this case, in spite of improvement of the performance of channel measurement and estimation, the absolute amount of transmission data is reduced, degrading the overall system capacity performance. Thus, there is a need for proper distribution of a resource for a reference signal and a resource for data transmission in a traffic channel to achieve optimal performance in terms of the overall system capacity.

Figure 2:
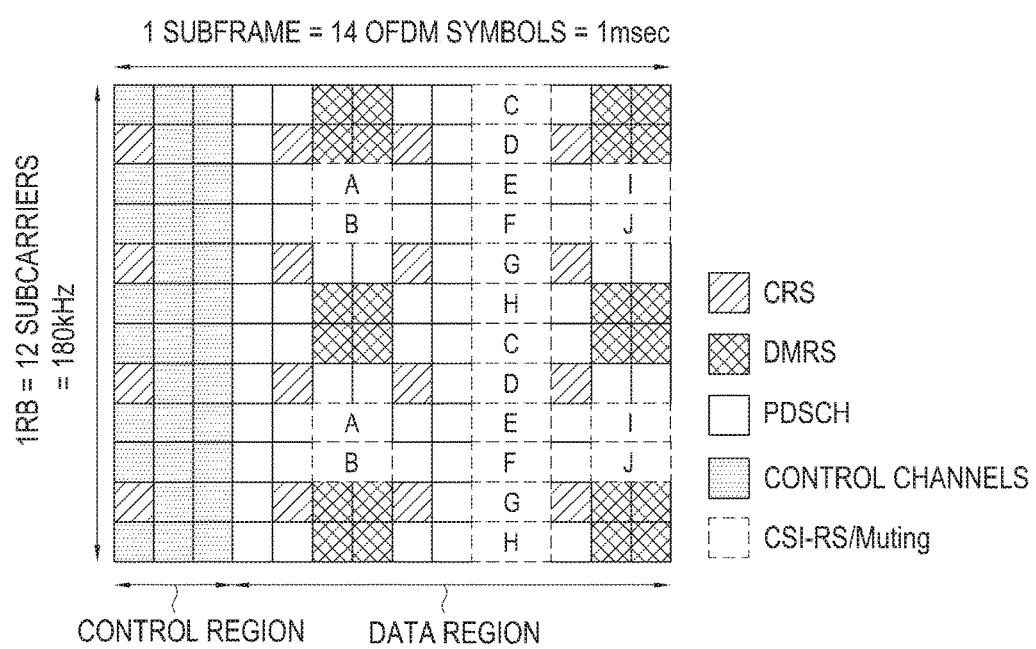
FIG. 2 is a view for describing a radio resource in an LTE system.

FIG. 2 is a view for describing a radio resource in an LTE system, showing a radio resource of one subframe and one resource block (RB), which is a minimum unit that may be downlink-scheduled.

Referring to FIG. 2, a radio resource includes one subframe on a time axis and one RB on a frequency axis. The radio resource includes 12 subcarriers on a frequency domain and 14 OFDM symbols on a time domain, thus having a total of 168 unique frequency and time positions. In the LTE system, each unique frequency and time position in FIG. 2 is referred to as a resource element (RE). In the radio resource shown in FIG. 2, a plurality of different types of signals as described below in 1) through 5) may be transmitted.

1) Cell Specific RS (CRS): a reference signal which is periodically transmitted for every UE belonging to one cell and is available commonly to a plurality of UEs.

2) Demodulation Reference Signal (DMRS): a reference signal which is transmitted for a particular UE and is transmitted when data is transmitted to the UE. The DMRS may include a total of 8 DMRS ports. In the LTE/LTE-A, ports 7 through 14 correspond to DMRS ports and maintain orthogonality so as not to incur interference therebetween by using CDM or FDM.

3) Physical Downlink Shared Channel (PDSCH): a data channel that is transmitted in a downlink and is used for a BS to transmit traffic to a UE, and is transmitted using an RE in which a reference signal is not transmitted in a data region of FIG. 2.

4) Channel State Information Reference Signal (CSI-RS): a reference signal that is transmitted for UEs belonging to one cell and is used to measure a channel status. A plurality of CSI-RSs may be transmitted in one cell.

5) Other control channels (PHICH, PCFICH, PDCCH): channels used to provide control information needed for a UE to receive a PDSCH or to transmit an acknowledgement (ACK)/negative ACK (NACK) for operating hybrid automatic repeat and request (HARQ) with respect to uplink data transmission.

In the LTE-A system, muting may be set to receive a CSI-RS transmitted by another BS without interference by UEs of the cell. The muting may be applied in a position at which a CSI-RS may be transmitted, and generally, the UE receives a traffic signal by skipping a corresponding radio resource. In the LTE-A system, muting is also referred to as a zero-power CSI-RS. This is because due to the nature of muting, muting is identically applied to the position of the CSI-RS and transmission power is not transmitted.

In FIG. 2, a CSI-RS may be transmitted using some of positions A, B, C, D, E, F, G, H, I, and J, depending on the number of antennas that transmit the CSI-RS. Muting may also be applied to some of the positions A, B, C, D, E, F, G, H, I, and J. In particular, a CSI-RS may be transmitted through 2, 4, and 8 REs according to the number of transmission antenna ports. For 2 antenna ports, a CSI-RS is transmitted through a half of a particular pattern in FIG. 2, and for 4 antenna ports, the CSI-RS is transmitted through the entire particular pattern, and for 8 antenna ports, the CSI-RS is transmitted through two patterns. On the other hand, muting is performed in the unit of one pattern at all times. That is, muting may be applied to a plurality of patterns, but may not be applied to a part of one pattern if not overlapping with the position of the CSI-RS. However, only in a case where the position of the CSI-RS overlaps with the position of muting, muting may be applied to a part of one pattern.

When a CSI-RS is transmitted for two antenna ports, a signal of each antenna port is transmitted through two REs connected on a time axis, and the signal of each antenna port is identified by an orthogonal code. When a CSI-RS is transmitted for four antenna ports, by further using two more REs in addition to the CSI-RS for the two antenna ports, the signal for the other two antenna ports is transmitted in the same manner. This process is also applied to transmit a CSI-RS for 8 antenna ports.

The positions A, B, C, D, E, E, F, G, H, I, and J to which the zero power CSI-RS is applicable may be set to interference measurement resources (IMRs) for interference measurement according to determination of the eNB. If the eNB sets one of A, B, C, D, E, E, F, G, H, I, and J to an IMR for the UE, the UE measures any signal collected in that position as interference and generates downlink channel state information. For example, an eNB may set the resource A as the IMR for the UE that is to receive data from the eNB and may not transmit any downlink signal in that position. In this case, a signal received in the resource A by the UE may be inter-cell interference generated in another eNB (i.e., another cell). That is, if the UE generates downlink channel state information based on the signal received in the resource A, the channel state information may automatically consider inter-cell interference generated in another eNB.

In a cellular system, the eNB has to transmit an RS to measure a downlink channel state. In the LTE-A system of the 3GPP, the UE measures a channel state between the eNB and the UE by using a CRS or a CSI-RS transmitted by the eNB. For the channel state, several elements need to be considered basically, including the amount of interference in the downlink. The amount of interference in the downlink includes an interference signal and a thermal noise generated by an antenna included in a neighboring eNB, and is important to the UE to determine a channel condition of the downlink. For example, if a transmission antenna transmits a signal to one UE in one personal eNB, the UE has to determine energy per symbol (Es) that may be received in the downlink using an RS received from the eNB and the amount of interference (Io) that is to be received at the same time in a period for receiving a symbol, and to determine Es/Io. The determined Es/Io is transformed to a data rate or a value corresponding thereto, and is notified to the eNB in the form of a channel quality indicator (CQI), to allow the eNB to determine a data rate at which transmission to the UE in the downlink is to be performed.

In the LTE-A system, the UE feeds information about a channel state of the downlink back to the eNB to allow the use of the channel state information in downlink scheduling of the eNB. That is, the UE measures the reference signal transmitted from the eNB in the downlink, and information extracted in the measurement is fed back to the eNB in a form defined in the LTE/LTE-A standard. In the LTE/LTE-A, the following information 1) through 3) are fed back by the UE.

1) Rank Indicator (RI): the number of spatial layers the UE may receive in a current channel state.

2) Precoder Matrix Indicator (PMI): an indicator of a precoding matrix the UE prefers in the current channel state.

3) Channel Quality Indicator (CQI): a maximum data rate at which the UE may receive data in the current channel state. The CQI may be replaced with SINR available similarly with a maximum data rate, a maximum error code rate and modulation scheme, a data efficiency per frequency, etc.

The RI, the PMI, and the CQI have meanings in relation to one another. For example, a precoding matrix supported in the LTE/LTE-A is defined differently for each rank. Thus, a PMI value X for RI of 1 and the PMI value X for RI of 2 are interpreted differently. It is also assumed that when the UE determines CQI, the PMI value X notified by the UE to the eNB is also applied in the eNB. That is, if the UE notifies the eNB of RI_X, PMI_Y, and CQI_Z, it means that the UE may receive data at a data rate corresponding to CQI_Z when the rank is RI_X and precoding is PMI_Y. As such, the UE assumes which transmission scheme is to be applied to the eNB in CQI calculation, thereby obtaining optimized performance when transmission is performed using the transmission scheme.

Table 1 shows an example of a CQI table specified in the current LTE standards. The CQI indicates a total of four bits of information, to which a line of the CQI table corresponds. For example, if the UE reports a CQI index of 12 to the eNB, then it means that the UE notifies to the eNB that the UE is supported in a channel having a measured data efficiency per frequency of 3.9023 bits/sec/Hz.

TABLE 1

| CQI index | modulation | code rate × 1024 | efficiency |
| --- | --- | --- | --- |
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 946 | 5.5547 |

If there are many transmission antennas as in FD-MIMO, a CSI-RS proportional to the transmission antennas have to be transmitted. For instance, if eight transmission antennas are used in the LTE/LTE-A, the eNB may transmit a CSI-RS corresponding to 8-ports to the UE to measure a downlink channel status. In this case, to transmit the CSI-RS corresponding to the 8-ports, the eNB needs to use a radio resource including eight REs as in the resources A and B of FIG. 2 in one RB. When such CSI-RS transmission based on the LTE/LTE-A is applied to FD-MIMO, a proportional number of radio resources to the number of transmission antennas have to be allocated to the CSI-RS. That is, if the number of transmission antennas of the eNB is N, the eNB has to transmit the CSI-RS by using a total of N REs in one RB.

Figure 3:
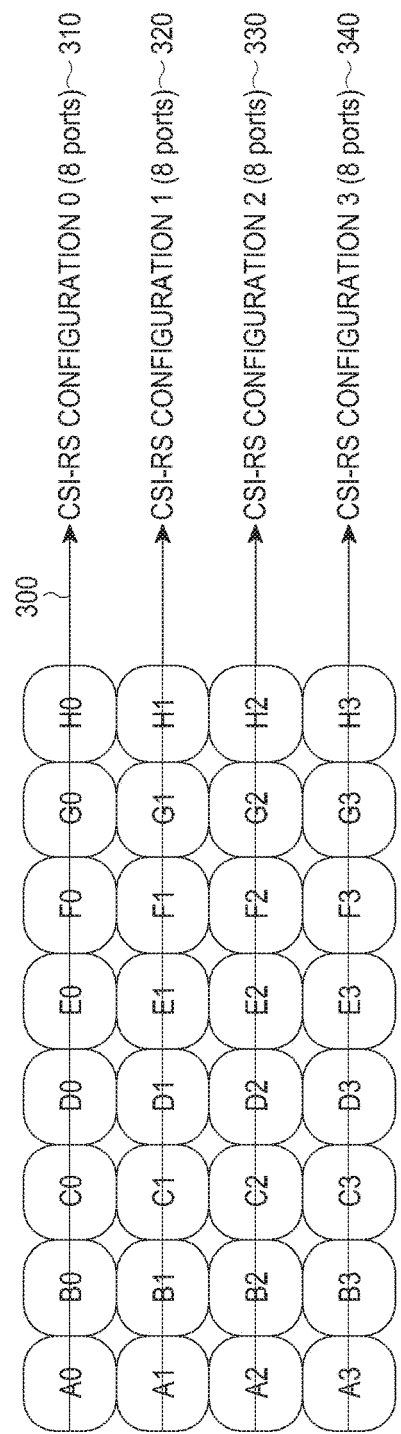
FIG. 3 illustrates an example of a channel state information-reference signal (CSI-RS) configuration in a wireless communication system according to an embodiment of the present disclosure.

FIG. 3 illustrates an example of a CSI-RS configuration in a wireless communication system according to an embodiment of the present disclosure.

In the example of FIG. 3, when the eNB has 32 transmission antennas, transmission is performed using four 8-port CSI-RS configurations. In this case, by using four pairs of radio resources, A-B, C-D, E-F, and G-H of FIG. 2, the eNB may transmit a CSI-RS for 32 transmission antennas.

In the example of FIG. 3, the eNB includes four transmission antennas in the vertical direction and eight transmission antennas in the horizontal direction on the 2D plane. The eNB maps each horizontal antenna array of the 32 transmission antennas to one CSI-RS configuration as indicated by 300. For example, eight transmission antennas A0 through H0 are mapped to CSI-RS configuration 0 310 to transmit a reference signal in a radio resource position of the CSI-RS configuration 0 310. Likewise, A1-H1, A2-H2, and A3-H3 are mapped to CSI-RS configuration 1, CSI-RS configuration 2, and CSI-RS configuration 3, respectively, thus transmitting a reference signal in a radio resource position of a corresponding CSI-RS configuration.

When transmission is performed using a plurality of CSI-RS configurations for transmission antennas on the 2D plane as shown in FIG. 3, the UE measures reference signals received in radio resource positions of the CSI-RS configurations, thereby measuring a channel for a 3D space. That is, the UE measures reference signals for the 32 transmission antennas in positions of the CSI-RS configurations 0, 1, 2, and 3, thereby determining a vertical or horizontal direction that is the most favorable to the UE to receive a signal.

Figure 4:
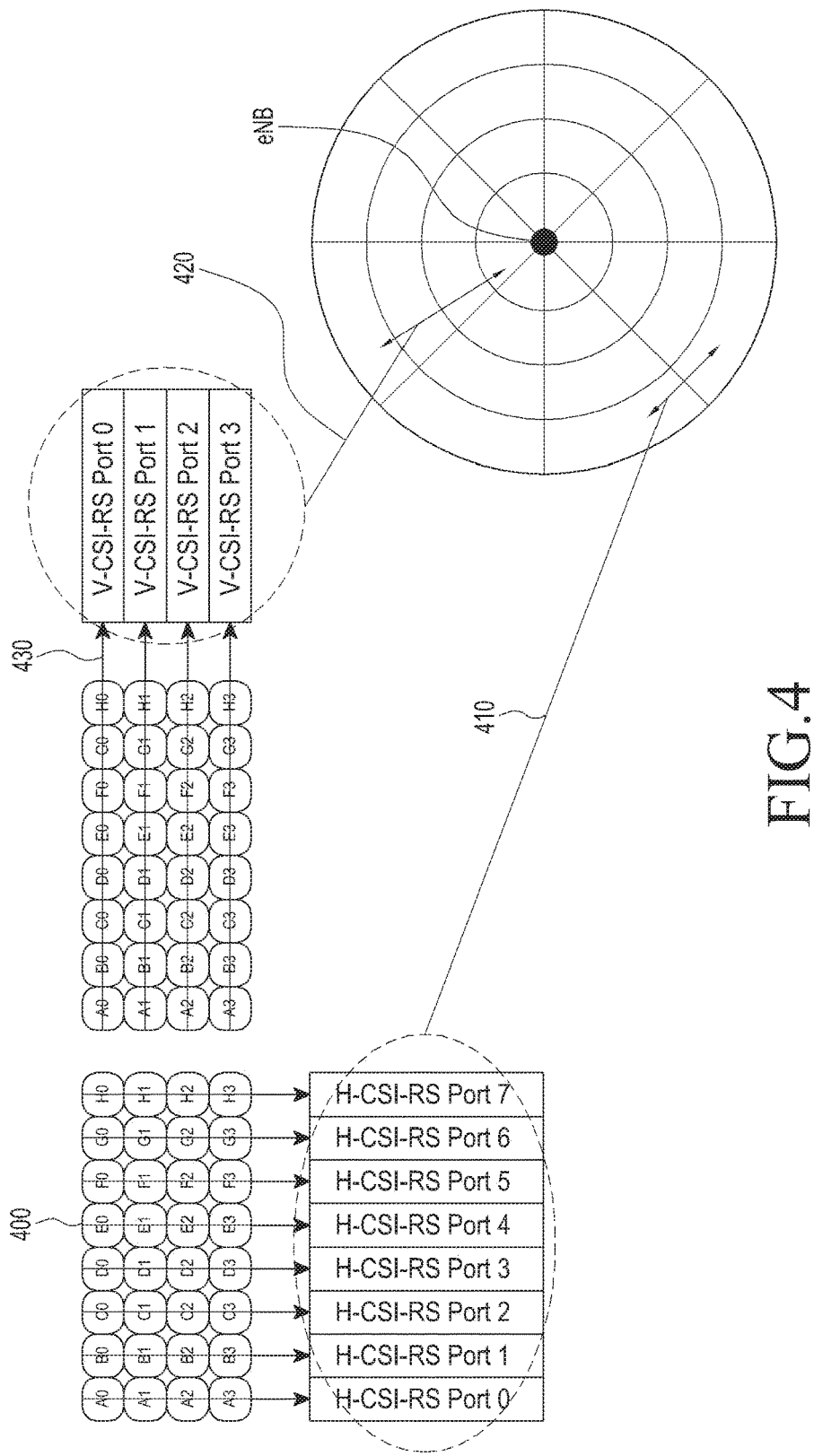
FIG. 4 is a view for describing a reference signal transmission method for channel measurement with respect to a three-dimensional (3D) space in a wireless communication system according to an embodiment of the present disclosure.

FIG. 4 is a view for describing a reference signal transmission method for channel measurement with respect to a 3D space in a wireless communication system according to an embodiment of the present disclosure.

Referring to FIG. 4, like in FIG. 3, the eNB is assumed to have four transmission antennas in the vertical direction and eight transmission antennas in the horizontal direction on the 2D plane. Instead of allocating CSI-RS configurations through which 32 CSI-RS ports are transmitted for 32 transmission antennas as shown in FIG. 3, the eNB may obtain a similar effect by allocating one 8-port CSI-RS configuration and one 4-port CSI-RS configuration as indicated by 400 and 430 in FIG. 4.

In an eNB having a large number of transmission antennas like in FD-MIMO, to allow the UE to perform channel measurement with respect to the large number of transmission antennas while preventing excessive radio resources from being allocated to transmission of a CSI-RS, the CSI-RS may be transmitted separately in N dimensions. For example, when the transmission antennas of the eNB are arranged in two dimensions as shown in FIG. 1, the CSI-RS may be transmitted by being divided for two dimensions. One CSI-RS may be managed as a horizontal CSI-RS for measuring channel information in the horizontal direction, and the other CSI-RS may be managed as a vertical CSI-RS for measuring channel information in the vertical direction.

Referring to FIG. 4, the eNB adopting FD-MIMO may include a total of 32 antennas. In FIG. 4, 32 antennas 400 are indicated by A0, . . . , A3, B0, . . . , B3, C0, . . . , C3, D0, . . . , D3, E0, . . . E3, F0, . . . , F3, G0, . . . , G3, and H0, . . . , H3. The 32 antennas in FIG. 4 are transmitted through two CSI-RSs. An H-CSI-RS for measuring a channel state in the horizontal direction may include eight antenna ports 1) through 8) as described below. In the H-CSI-RS, "H" means the horizontal direction.

1) H-CSI-RS port 0: including antennas A0, A1, A2, and A3.

2) H-CSI-RS port 1: including antennas B0, B1, B2, and B3.

3) H-CSI-RS port 2: including antennas C0, C1, C2, and C3.

4) H-CSI-RS port 3: including antennas D0, D1, D2, and D3.

5) H-CSI-RS port 4: including antennas E0, E1, E2, and E3.

6) H-CSI-RS port 5: including antennas F0, F1, F2, and F3.

7) H-CSI-RS port 6: including antennas G0, G1, G2, and G3.

8) H-CSI-RS port 7: including antennas H0, H1, H2, and H3.

Generation of one CSI-RS port including a combination of a plurality of antennas means antenna virtualization, and is generally performed by linear combination of the plurality of antennas. A V-CSI-RS for measuring a channel state in the vertical direction may include four antenna ports 1) through 4) as described below. In the V-CSI-RS, "V" means the vertical direction.

1) V-CSI-RS port 0: including antennas A0, B0, C0, D0, E0, G0, and H0.

2) V-CSI-RS port 1: including antennas A1, B1, C1, D1, E1, G1, and H1.

3) V-CSI-RS port 2: including antennas A2, B2, C2, D2, E2, G2, and H2.

4) V-CSI-RS port 3: including antennas A3, B3, C3, D3, E3, G3, and H3.

As such, when the plurality of antennas are arranged in two dimensions M×N (vertical direction×horizontal direction), a channel may be measured using N CSI-RS ports in the horizontal direction and M CSI-RS ports in the vertical direction in an FD-MIMO system. That is, when two CSI-RSs are used, channel state information may be recognized using (M+N) CSI-RS ports for M×N transmission antennas. Recognizing information for more transmission antennas using less CSI-RS ports is useful to reduce a CSI-RS overhead. In the above example, channel information for transmission antennas of the FD-MIMO system has been recognized using two CSI-RSs, and this approach is equally applicable to the use of K CSI-RSs.

The 32 transmission antennas shown in FIG. 4 are transmitted by being allocated with eight H-CSI-RS ports and four V-CSI-RS ports, allowing the UE to measure radio channels of the FD-MIMO system. In the above example, H-CSI-RS enables the UE to measure information about a horizontal angle between the UE and a transmission antenna of the eNB as indicated by 410, whereas V-CSI-RS enables the UE to measure information about a vertical angle between the UE and the transmission antenna of the eNB as indicated by 420.

The UE may obtain information about radio channels in the vertical and horizontal directions between the UE and the eNB by measuring one or more CSI-RSs transmitted as shown in FIG. 3 or 4. By using radio channel information obtained in this way, the UE generates channel state information regarding a downlink radio channel and reports the channel state information to the eNB.

Figure 5:
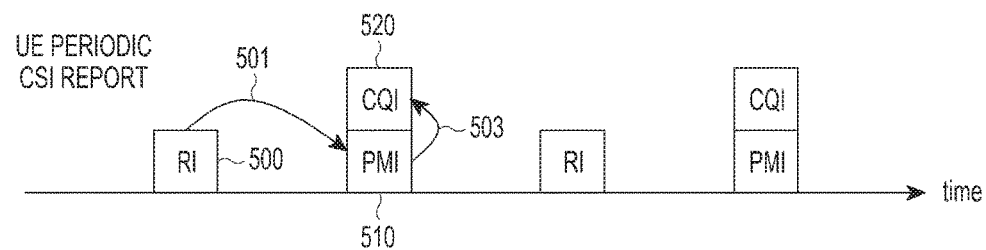
FIG. 5 is a view for describing a method for reporting channel state information to an eNB by a UE in a wireless communication system according to an embodiment of the present disclosure.

FIG. 5 is a view for describing a method for reporting channel state information to an eNB by a UE in a wireless communication system according to an embodiment of the present disclosure.

Referring to FIG. 5, arrows 501 and 503 indicate how one type of channel state information is related to interpretation of another type of channel state information (CSI). That is, when the arrow 501 starting from an RI 500 ends at a PMI 510, it means that interpretation of the PMI 510 depends on a value of the RI 500. In FIG. 5, the UE generates channel state information by measuring a CSI-RS and reports the channel state information to the eNB. In this example, the RI 500, the PMI 510, and a CQI 520 are transmitted with relationships therebetween. That is, the RI 500 notifies a rank of a precoding matrix to be indicated by the PMI 510 to be transmitted. The CQI 520 indicates a data rate at which the UE may receive data or a value corresponding thereto if the precoding matrix of the rank indicated by the PMI 510 is applied when the eNB performs transmission with the rank indicated by the RI 500. The eNB identifies a state of a downlink radio channel of the UE based on the channel state information of FIG. 5 reported by the UE and determines a data rate at which a data signal is to be transmitted to the UE.

As mentioned above, in the FD-MIMO system, a direction of a signal transmitted to the UE may be adjusted in the vertical axis and/or the horizontal axis by using multiple transmission antennas arranged on the 2D plane, thereby optimizing the performance of the FD-MIMO system. Adjustment of the signal transmitted by the eNB in the vertical axis and/or the horizontal axis is not applicable to an existing wireless communication system, and may be applicable to only an eNB having multiple antennas arranged on the 2D plane like in FD-MIMO.

Figure 6:
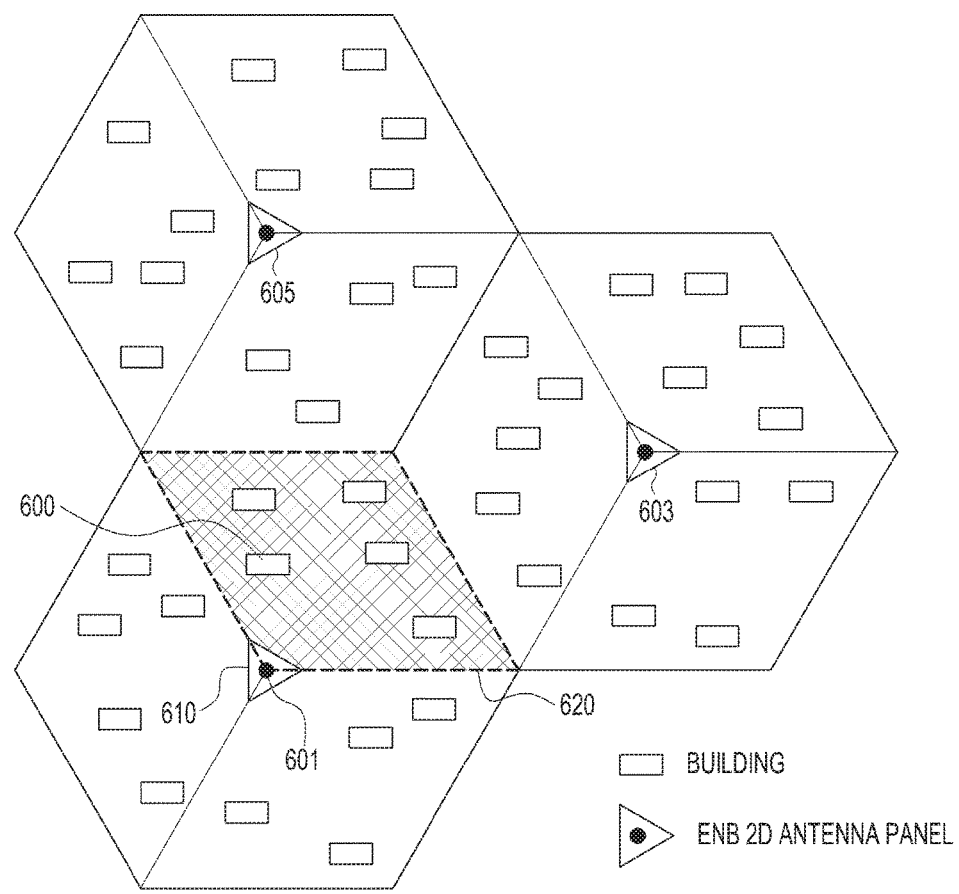
FIG. 6 illustrates an example of a multi-cell structure in a wireless communication system according to an embodiment of the present disclosure.

FIG. 6 illustrates an example of a multi-cell structure in a wireless communication system according to an embodiment of the present disclosure.

Referring to FIG. 6, it is assumed that the system includes three eNBs 601, 603, and 605, each of which manages three sectors or cells that are in charge of 120 degrees by dividing 360 degrees by 3, respectively, to support a wireless communication service in all directions of 360 degrees. In the example of FIG. 6, there are three eNBs and nine sectors or cells. For each sector, the eNB uses a 2D-planar antenna array 610 of FIG. 6.

As mentioned previously, the eNB adjusts the horizontal direction and the vertical direction of a transmission signal by using multiple antennas arranged on the 2D plane. FIG. 6 is a top plane view of eNBs viewed from the top, and thus a description will be made in relation to only the horizontal direction. The eNB 601 provides a wireless communication service to UEs belonging to a sector 620 by using the 2D antenna array 610. The eNB 601 adjusts the horizontal direction of a transmission signal differently according to a position of the UE in the sector 620.

When a signal is transmitted in one sector, the signal acts as interference affecting a UE for receiving a wireless communication service in another sector. This is called inter-cell interference. Also in FIG. 6, the signal transmitted from the 2D antenna array 610 acts as interference affecting a UE in another sector adjacent to the sector 620. For the horizontal direction, generally, an influence is averagely similar among directions in which the eNB transmits a signal. That is, the amount of interference affecting another sector is averagely similar between a case where the signal is transmitted in the 12 o'clock direction from the 2D antenna array 610 and a case where the signal is transmitted in the 3 o'clock direction. For this reason, normally, for the horizontal direction, a radio signal is transmitted with the same allocated transmission power for all directions.

Figure 7:
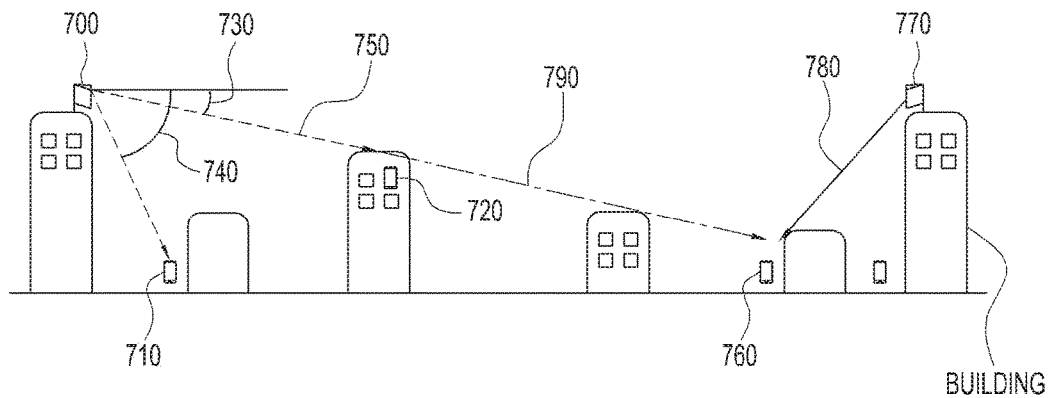
FIG. 7 is a view for describing an influence of interference based on a vertical angle of a transmission signal transmitted through an antenna array in a wireless communication system according to an embodiment of the present disclosure.

FIG. 7 is a view for describing an influence of interference based on a vertical angle of a transmission signal transmitted through an antenna array in a wireless communication system according to an embodiment of the present disclosure.

Referring to FIG. 7, it is assumed that two eNBs manage sectors by using two 2D antenna arrays 700 and 770, respectively. The 2D antenna arrays 700 and 770 are installed on buildings, and each eNB provides a wireless communication service to a UE located in a sector managed by the eNB. For example, between the two eNBs, a first eNB using the 2D antenna array 700 transmits a radio signal to a UE 710 and a UE 720. When the first eNB transmits a radio signal to the UE 710, the first eNB transmits the signal in such a way that the vertical direction of the signal transmitted through the 2D antenna array 700 has an angle 740. When the first eNB transmits a radio signal to the UE 720, the first eNB transmits the signal in such a way that the vertical direction of the signal transmitted through the 2D antenna array 700 has an angle 730.

As in the above example, when the first eNB transmits the radio signals to the UE 710 and the UE 720 through the 2D antenna array 700 in FIG. 7, respectively, the first eNB transmits the signals at different angles in the vertical direction. When the radio signals are transmitted in different vertical directions in this way, influences of the signals upon a UE belonging to an adjacent sector or cell are different. For example, as the radio signal transmitted to the UE 710 through the 2D antenna array 700 is transmitted at a larger vertical angle, it has a small influence upon a UE 760 receiving a radio signal (780) from a neighboring second eNB using the 2D antenna array 770. On the other hand, as a radio signal 790 transmitted to the UE 720 through the 2D antenna array 700 of the first eNB is transmitted at a smaller vertical angle, it has a large influence upon the UE 760 receiving a radio signal 780 through the 2D antenna array 770 of the second eNB located adjacent to the first eNB.

That is, even radio signals transmitted from the same 2D antenna array have different magnitudes of interference affecting a UE in an adjacent sector or cell according to vertical angles at which the signals are transmitted. As shown in FIG. 7, even if radio signals are transmitted with the same transmission power, the magnitude of interference affecting an adjacent sector or cell increases as a vertical angle decreases.

As in the example of FIG. 7, when the vertical angle of a transmission signal is adjusted variably using a 2D antenna array, optimal system performance may be obtained by considering an influence upon an adjacent sector or cell. Taking into account the above-described feature that an influence upon an adjacent cell differs with a vertical angle of the transmission signal, the present disclosure proposes different management of a transmission power of the transmission signal according to the vertical angle of the transmission signal.

Figure 8:
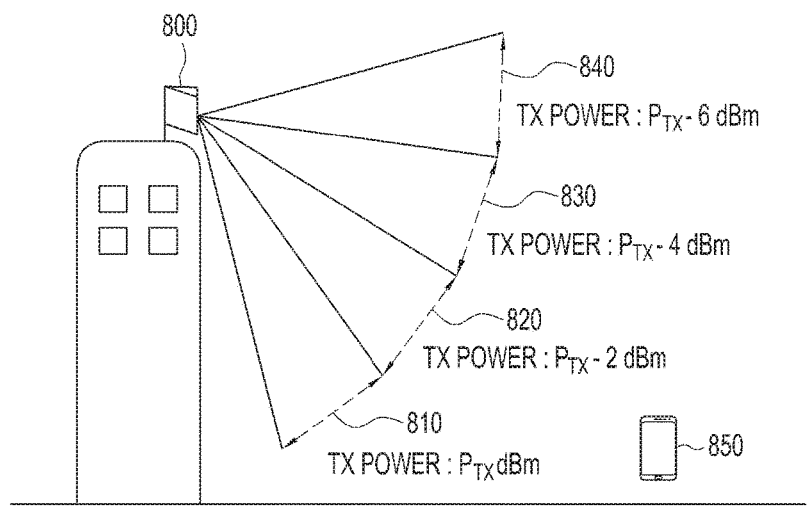
FIG. 8 is a view for describing a transmission power control method based on a vertical angle of a transmission signal in a wireless communication system according to an embodiment of the present disclosure.

FIG. 8 is a view for describing a transmission power control method based on a vertical angle of a transmission signal in a wireless communication system according to an embodiment of the present disclosure, showing an example of a transmission power control method where a transmission (TX) power of a transmission signal transmitted from a 2D antenna array of an eNB is managed differently with a vertical angle of the transmission signal.

In the example of FIG. 8, the eNB allocates different transmission powers according to angles 810, 820, 830, and 840 at which the eNB transmits a transmission signal to a UE 850 through a 2D antenna array 800. When transmitting a radio signal in a downward direction like 810, the eNB allocates a transmission power $P_{TX}$ dBm to the radio signal. dBm, an abbreviation for decibel-milliwatts, is a unit indicating a magnitude of a power. On the other hand, when transmitting a radio signal in a direction in which large interference may affect an adjacent cell like 840, the eNB allocates a transmission power $P_{TX}$ −6 dBm to the radio signal. By allocating a different transmission power to a transmission signal transmitted by an eNB according to a vertical angle of the transmission signal, effective inter-cell interference management may be possible.

As an example of a method for controlling a transmission power of a transmission signal transmitted through a 2D antenna array by an eNB according to a vertical angle of the transmission signal as shown in FIG. 8, a UE needs downlink channel state information assuming this situation. As stated above, the UE generates downlink channel state information by using a downlink reference signal and an interference measurement resource transmitted from the eNB. Basically, the UE reports a data rate that the UE may support in a downlink radio channel to the eNB through the downlink channel state information. To perform effective wireless communication in a situation where a transmission power of a transmission signal is controlled differently according to a vertical angle of the transmission signal, the UE, when generating the downlink channel state information to be reported to the eNB, needs to consider that a different transmission power is allocated for each vertical angle of the transmission signal.

Hereinbelow, a description will be made of various embodiments of a method performed in an eNB and a method performed in an UE so as to apply a method for controlling a different transmission power according to a vertical angle of a transmission signal. In the above-described embodiment, a 2D antenna array is used as an example, but a multi-dimensional antenna array capable of controlling a vertical angle of a transmission signal may also be used in the same manner.

First Embodiment

In the first embodiment, the eNB transmits a different reference signal (e.g., a CSI-RS) for each vertical angle of a transmission signal and allocates a different transmission power to each CSI-RS. In LTE, the UE receives a CSI-RS and calculates the reception energy of the CSI-RS to generate channel state information.

Figure 9:
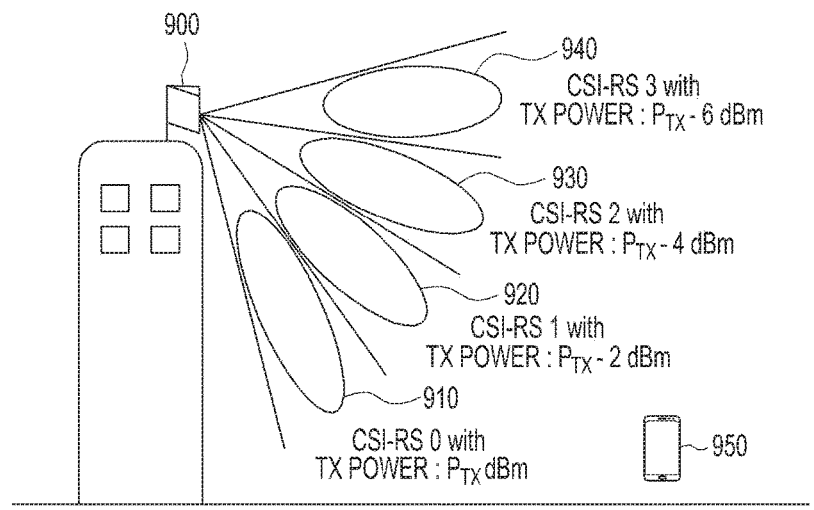
FIG. 9 is a view for describing a transmission power control method in a wireless communication system according to a first embodiment of the present disclosure.

FIG. 9 is a view for describing a transmission power control method in a wireless communication system according to the first embodiment of the present disclosure.

As in the example shown in FIG. 9, when a different transmission power is allocated to a CSI-RS transmitted at a different vertical angle, the UE measures a corresponding reception energy and generates channel state information accordingly.

Referring to FIG. 9, the eNB transmits four CSI-RSs CSI-RS0 910, CSI-RS1 920, CSI-RS2 930, and CSI-RS3 940 at different transmission angles through a 2D antenna array 900, and allocates different transmission powers to the four CSI-RSs. The eNB causes a UE 950 to measure the four transmitted CSI-RSs. Each CSI-RS includes one or more CSI-RS antenna ports. A transmission power allocated to each CSI-RS is different as shown in FIG. 9. The UE measures the four CSI-RSs to generate downlink channel state information for each CSI-RS and reports the downlink channel state information to the eNB. The eNB receives the channel state information for the four CSI-RSs from the UE and determines a vertical direction in which a radio signal is to be transmitted to the UE.

One of benefits from the first embodiment is that the UE measures the reception energy of each CSI-RS and generates channel state information without having to know that the eNB allocates a different transmission power to each CSI-RS. However, in this case, due to a different transmission power allocated to each CSI-RS according to a vertical angle, the accuracy of channel measurement of the UE may differ with the vertical angle. For example, the CSI-RS 0 910 is transmitted with a transmission power higher by 6 dBm than the CSI-RS 3 940. As a result, the UE may more accurately measure a channel when receiving the CSI-RS 0 910 than when receiving the CSI-RS 3 940.

In the first embodiment, in a way to solve a problem that channel measurement accuracy of the UE varies with a transmission power allocated to a CSI-RS based on a vertical angle, the present disclosure proposes a solution as described below. In this solution, the same transmission power is allocated to a CSI-RS transmitted at any vertical angle. Instead, the eNB notifies the UE that a different transmission power may be allocated according to a vertical angle when a data signal PDSCH is received. In an LTE system, the UE measures one CSI-RS to determine the highest data rate in a channel at which the UE may receive data, and notifies the determined data rate to the eNB. In the current embodiment, the UE determines the highest data rate that is supportable by the UE based on an eNB-set transmission power allocated for transmission of a data signal PDSCH according to each CSI-RS, and generates channel state information based on the determined data rate.

In an example where this solution is applied, the UE may select N CSI-RSs from among a plurality of CSI-RSs and report channel state information regarding the CSI-RSs to the eNB. In this case, the UE determines, for each CSI-RS, the highest data rate that is supportable by the UE based on an eNB-set transmission power allocated based on each CSI-RS, and selects CSI-RSs enabling the highest N data rates and reports channel state information regarding the CSI-RSs to the eNB. The UE may also transmit a CSI-RS indicator for notifying the N CSI-RSs regarding which the channel state information is to be reported to the eNB, together with the channel state information.

The solution may be described as below in 1) through 4).

1) The eNB causes the UE to measure M CSI-RSs transmitted at different vertical angles to the UE and to report channel state information regarding the M CSI-RSs. Information configured for UE's CSI-RS measurement by the eNB includes a transmission power allocated to CSI-RS-specific data signal PDSCH transmission.

2) The UE determines a CSI-RS-specific CQI by considering an eNB-set transmission power allocated to the CSI-RS-specific data signal PDSCH transmission.

3) The UE selects N (M≥N) CSI-RSs supporting the highest CQI from among the M CSI-RSs according to a channel state report method set by the eNB.

4) The UE reports channel state information regarding the N CSI-RSs selected in 3) to the eNB. Moreover, the UE also reports CSI-RS indicator information for notifying the N CSI-RSs among the M CSI-RSs to the eNB.

Second Embodiment

In the second embodiment, the same CSI-RS is transmitted at set or possible all angles or a plurality of angles and a different transmission power is allocated according to a beamforming direction.

Figure 10:
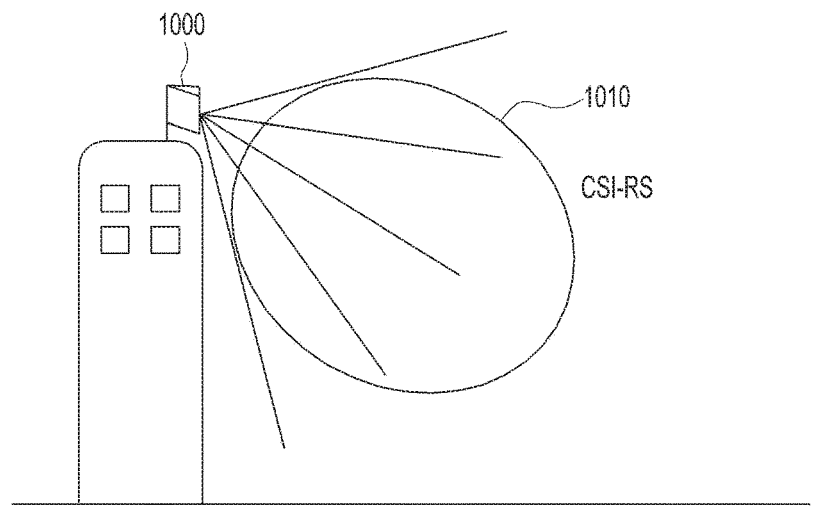
FIGS. 10 and 11 are views for describing a transmission power control method in a wireless communication system according to a second embodiment of the present disclosure.

FIG. 10 is a view for describing a transmission power control method in a wireless communication system according to the second embodiment of the present disclosure.

In the second embodiment, in a 2D antenna array of the eNB, one CSI-RS 1010 is transmitted at all or a plurality of vertical angles as shown in FIG. 10. As mentioned above, the CSI-RS 1010 includes one or more CSI-RS antenna ports.

In FIG. 10, the UE that is to receive a CSI-RS transmitted by the eNB may receive a CSI-RS transmitted through a plurality of CSI-RS antenna ports. The UE measures a radio channel between antennas of the 2D antenna array and the UE by using the plurality of CSI-RS antenna ports. The UE determines its preferred antenna beam-forming direction based on the radio channel, and reports information related to the beamforming direction to the eNB. To report the information related with the beamforming direction, the UE may determine a PMI and report the determined PMI to the eNB in the LTE system as an example. The PMI corresponds to indicator information indicating a precoder matrix preferred by the UE in a precoder codebook that is a set of precoder matrices specified in the 3GPP standards in advance. Each precoder matrix indicated through the PMI is related to a vertical angle and a horizontal angle of a signal to be transmitted by the eNB. For example, one precoder matrix may cause an eNB signal to be transmitted in the direction 810 and another precoder matrix may cause an eNB signal to be transmitted in the direction 820 in FIG. 8.

Figure 11:
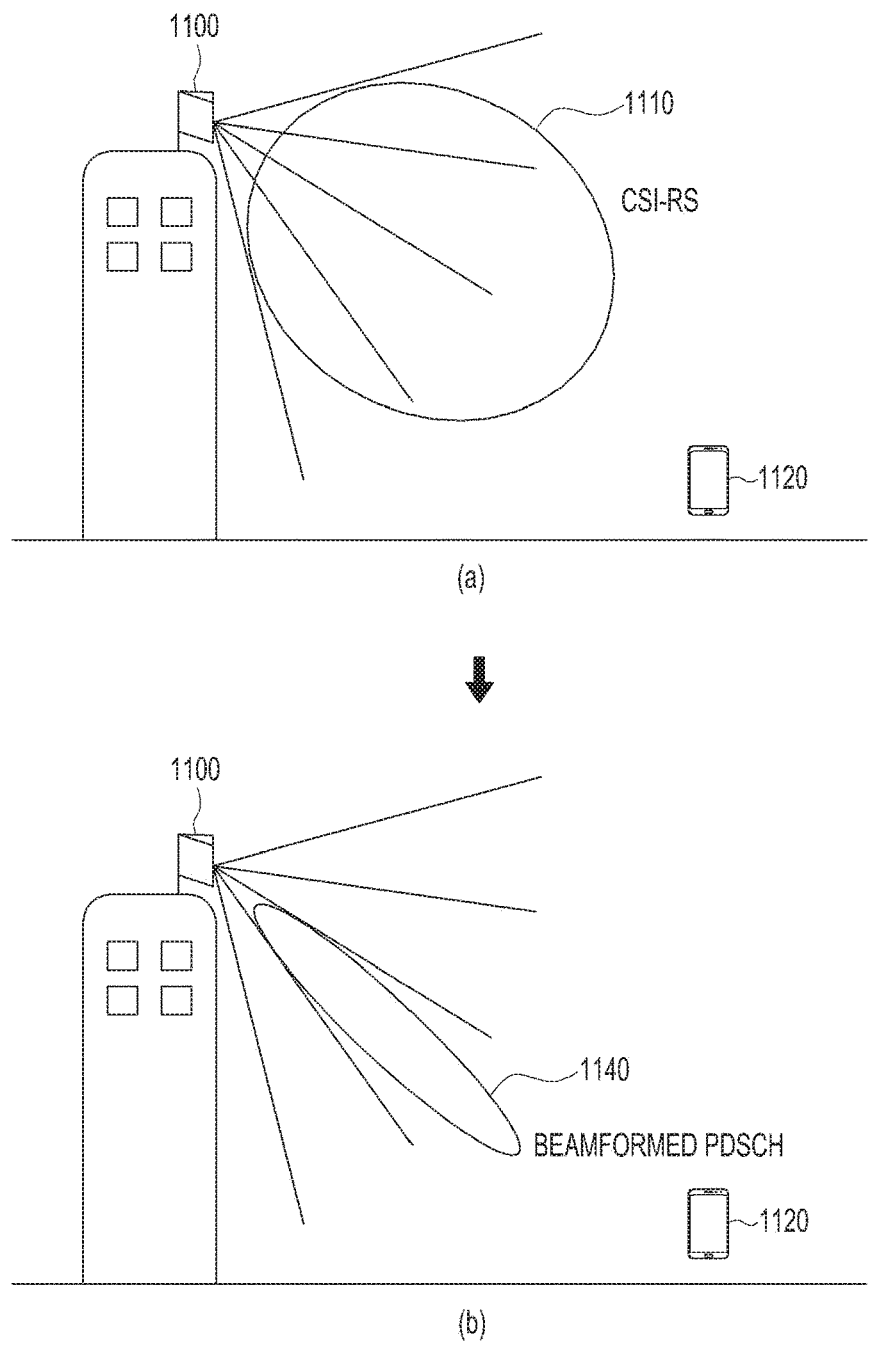

FIG. 11 is a view for describing a transmission power control method in a wireless communication system according to the second embodiment of the present disclosure.

FIG. 11 shows an example where the UE measures a CSI-RS transmitted by the eNB and notifies a PMI to the eNB to receive a radio signal at the optimal vertical angle (e.g., a reception angle corresponding to the smallest influence of interference or a reception angle corresponding to the best channel state), and the eNB transmits a data signal by applying a precoder matrix indicated by the PMI. The PMI may be set corresponding to the vertical angle of the transmission signal.

Referring to FIG. 11, in (a) of FIG. 11, a UE 1120 measures CSI-RSs transmitted by an eNB at all or a plurality of vertical angles to measure a radio channel for a plurality of antennas. The UE 1120 determines a precoding matrix to be determined by the eNB, which is most favorable to the UE 1120, based on the measured radio channel. The UE 1120 reports a PMI indicating the determined precoding matrix to the eNB 1100, and in (b) of FIG. 11, the eNB 1100 transmits a data signal to the UE 1120 as indicated by 1140 by using the indicated precoding matrix. In this case, the data signal transmitted to the UE 1120 is transmitted by being beamformed based on the PMI notified to the eNB 1100 by the UE 1120. That is, the data signal is beamformed toward the UE 1120 by considering a radio channel such as a position of the UE 1120, etc., as indicated by 1140.

When the UE notifies the PMI to the eNB which then performs beamforming based on the PMI to determine a vertical angle of a radio signal to be transmitted to the UE as shown in FIG. 11, an embodiment of the present disclosure proposes a method for previously notifying a different transmission power for each PMI to the UE. That is, the eNB notifies a transmission power of the eNB to be allocated through a PMI when selecting the PMI to the UE through high-layer signaling in advance. In another example, the PMI-specific transmission power information may be broadcast through system information or using information pre-agreed between the UE and the eNB.

After being notified of the information from the eNB, the UE identifies the transmission power of the eNB to be allocated for each PMI and selects a PMI based on the transmission power. Also in a process of generating a CQI based on the selected PMI after selecting the PMI, the UE reflects information related to the transmission power. For example, it is assumed that a PMI-specific eNB transmission power is configured in the UE by the eNB as shown in Table 2. In this case, the UE generates its downlink channel state information based on transmission power information of Table 2. That is, the UE is assumed to be allocated with a transmission power of $P_{TX}$ dBm from the eNB when selecting PMI=0. On the other hand, the UE is assumed to be allocated with a transmission power of $P_{TX}-4$ dBm from the eNB when selecting PMI=2. The UE having to select one of four PMIs of Table 2 may assume allocation of different transmissions, determine its preferred PMI value, and report the determined PMI value to the eNB.

TABLE 2

| PMI | Tx Power at eNB |
|---|---|
| 0 | $P_{TX}$ dBm |
| 1 | $P_{TX}-2$ dBm |
| 2 | $P_{TX}-4$ dBm |
| 3 | $P_{TX}-6$ dBm |

As shown in Table 2, if it is assumed that an eNB transmission power is allocated to each PMI, the UE determines a data rate that is supportable for each PMI or a signal to noise and interference ratio (SNIR), taking into account that a different transmission power is to be allocated for each PMI. Thereafter, the UE reports a PMI for obtaining a maximum data rate or a maximum SNIR to the eNB. The UE may also transmit information related to a data rate the UE may obtain when the eNB applies the PMI. The information related to the data rate is preferably transmitted in the same time period as the PMI, but in the proposal of the present disclosure, may also be transmitted after transmission of the PMI. In the LTE system, the data rate-related information may be notified to the eNB from the UE in the form of a CQI.

For example, in the LTE/LTE-A system, as in Table 3, in order for the eNB to configure information indicating that a different transmission power is to be allocated for each PMI for the UE, the eNB may notify a transmission power ratio of a data signal PDSCH to a CSI-RS for each PMI as well as notification of a PMI-specific transmission power to the UE. In an embodiment of the present disclosure, this ratio will be referred to as $G_X$ and will be defined as below.

Definition of $G_X$: a ratio of a transmission power of a data signal PDSCH to a transmission power of a CSI-RS, and $G_X$ is set differently for each PMI.

$$G_X = \frac{PDSCH\ EPRE\ \text{(Energy per Resource Element)}}{CSI - RS\ EPRE\ \text{(Energy per Resource Element)}} \quad \text{Equation 1}$$

TABLE 3

| PMI | $G_X$ | Interpretation of UE |
|---|---|---|
| 0 | 0 dB | UE assumes a transmission power of PDSCH and a transmission power of CSI-RS has a difference of 0 dB for PMI = 0 |
| 1 | −2 dB | UE assumes a transmission power of PDSCH and a transmission power of CSI-RS has a difference of −2 dB for PMI = 1 |
| 2 | −4 dB | UE assumes a transmission power of PDSCH and a transmission power of CSI-RS has a difference of −4 dB for PMI = 2 |
| 3 | −6 dB | UE assumes a transmission power of PDSCH and a transmission power of CSI-RS has a difference of −6 dB for PMI = 3 |

Third Embodiment

In the third embodiment, the UE applies in advance a coefficient that is proportional to transmission power allocation to a precoding matrix codebook from which the UE may select its preferred precoding. Generally, in the LTE system, a separate precoding matrix codebook is designed for each rank. The rank-specific precoding matrix codebook includes one or more precoding matrices. A precoding matrix of an existing LTE system is designed to transmit the same power in spite of the use of any precoding matrix. That is, for an arbitrary precoding matrix C, Equation 2 is established.

$$\sum_{i,j} |C_{i,j}|^2 = 1 \quad \text{Equation 2}$$

Herein, "i" indicates an index of a layer in MIMO transmission and j indicates an index of an antenna port in MIMO transmission.

The third embodiment proposes effectively adjusting a transmission power by applying a different coefficient related to transmission power allocation for each precoding matrix of a precoding matrix codebook. For example, a precoding matrix D corresponding to a direction having a larger influence of interference upon an adjacent cell applies a coefficient $$\frac{1}{\sqrt{2}}$$

to an existing precoding matrix to establish the following equation. In this case, Equation 3 is established.

$$\sum_{i,j} |D_{i,j}|^2 = 0.5 \quad \text{Equation 3}$$

When a sum of squares of absolute values of elements of a precoding matrix is equal to 0.5 as in Equation 3, the UE recognizes that only a 50% transmission power is allocated when compared to a precoding matrix C satisfying Equation 2. In contrast, a precoding matrix E corresponding to a direction having a small influence upon an adjacent cell applies a coefficient $\sqrt{2}$ to an existing precoding matrix to establish Equation 4. In this case, Equation 4 is established.

$$\sum_{i,j} |E_{i,j}|^2 = 2 \quad \text{Equation 4}$$

When a sum of squares of absolute values of elements of a precoding matrix is equal to 2 as in Equation 4, the UE recognizes that a 200% transmission power is allocated when compared to the precoding matrix C satisfying Equation 2. In Equation 3 and Equation 4, values of coefficients are examples and may be set to proper values that are inversely proportional to a degree to which interference may affect an adjacent cell. That is, a value of a coefficient may be set small for a direction affecting large interference.

As such, in the third embodiment, by applying a different coefficient to each precoding matrix of a precoding matrix codebook selected by a UE, the UE may consider a transmission power to be allocated when selecting its preferred precoding matrix. To this end, the eNB delivers a precoding matrix codebook in which the coefficient value is designed to the UE based on transmission power allocation. In this case, the eNB may deliver an arbitrary precoding matrix codebook to the UE, but the amount of information to be delivered to the UE from the eNB increases. To compensate for this weak point, one precoding matrix codebook is used, but the eNB may notify only a coefficient to be applied for each precoding matrix to the UE. In this case, limited information may be notified when compared to a case where the eNB notifies the UE of the entire precoding matrix codebook, but the amount of information is reduced. Moreover, when the eNB notifies the UE of a coefficient to be applied for each precoding matrix, the eNB may separately transmit coefficients for all precoding matrices to the UE or may transmit coefficients together with indicator information indicating some precoding matrices to the UE. It is assumed that a default coefficient (e.g., 1) is applied to a precoding matrix to which a coefficient is not separately allocated.

In the above example, a description has been made of a method proposed in the present disclosure where a different transmission power is allocated for each vertical angle of a transmission signal and transmission is performed (e.g., FD-MIMO transmission) based on the allocated different transmission power. In addition to allocation of a different transmission power for each vertical angle of a transmission signal, the number of times the UE incurs large interference affecting an adjacent cell may be reduced for effective adjacent-cell interference management. In an embodiment of the present disclosure, to reduce the number of times large interference affecting an adjacent cell is generated, two methods (a fourth embodiment and a fifth embodiment) will be proposed.

Fourth Embodiment

In the fourth embodiment, the same transmission power is allocated to CSI-RSs transmitted at all vertical angles like in the solution of the first embodiment. Instead, the eNB sets CQI_offset for each CSI-RS to the UE when selecting the optimal CSI-RS. CQI_offset proposed in the current embodiment acts as a correction value for a CQI calculated by measuring a CSI-RS when the UE selects the CSI-RS. As described above, in the LTE system, generally, the UE measures one CSI-RS to determine a CQI the UE may support in a channel, and notifies the eNB of the CQI. When the UE measures M CSI-RSs as in the current embodiment, the UE determines the CQI in the channel for each CSI-RS. If the UE measures four CSI-RSs as shown in FIG. 9, the UE determines a CQI for each CSI-RS and thus calculates a total of four CQIs. The UE may be configured to report only some of the M CQIs to the eNB. In this case, the UE has to select N (M≥N) CQIs from among the M CQIs and may apply CQI_offset for the selection. The UE reduces a CQI calculated for each CSI-RS by CSI-RS-specific CQI_offset set by the eNB. The UE selects N CQIs based on results of reducing the M CQIs by CQI_offset, and reports the selected N CQIs to the eNB.

The method according to the fourth embodiment may be described as below in 1) through 5).

1) The eNB causes the UE to measure M CSI-RSs to the UE and to report channel state information regarding the M CSI-RSs. Information configured for the UE by the eNB for CSI-RS measurement includes a CSI-RS-specific CQI_offset value (CQI_offset0, CQI_offset1, . . . , and CQI_offsetM−1 for M CSI-RSs).

2) The UE calculates a CQI for each CSI-RS.

3) The UE reduces each CSI-RS-specific CQI by CQI_offset.

4) The UE selects N (M≥N) CSI-RSs based on a channel state report method set by the eNB according to a channel state report method set by the eNB.

5) The UE reports channel state information regarding the N CSI-RSs selected in 4) to the eNB. Moreover, the UE also reports CSI-RS indicator information for notifying the N CSI-RSs among the M CSI-RSs to the eNB.

In the fourth embodiment, CQI_offset is assumed to be determined based on a CQI. The current embodiment may be similarly applied based on a data rate in place of a CQI.

Fifth Embodiment

In the fifth embodiment, the same CSI-RS is transmitted at all or a plurality of angles or a plurality of angles and a different rate_offset is allocated according to a beam-forming direction. In the fifth embodiment, in a 2D antenna panel of the eNB, one CSI-RS 1010 is transmitted at all or a plurality of vertical angles as shown in FIG. 10. As mentioned above, the CSI-RS 1010 includes one or more CSI-RS antenna ports.

In the fifth embodiment, rate_offset as in the fourth embodiment is set for each PMI. That is, the eNB calculates a supportable data efficiency per frequency for each PMI, corrects the data efficiency by rate_offset, and allows the UE to use the corrected data efficiency for selection of an optimal PMI. In this case, rate_offset may be set differently for each PMI such that the eNB controls the number of times the UE selects a specific PMI. Table 4 shows an example of rate_offset set for each PMI according to the current embodiment.

TABLE 4

| PMI | rate_offset | Interpretation of UE |
|---|---|---|
| 0 | 0 bps/Hz | UE selects optimal PMI without correcting data efficiency per frequency for PMI = 0 |
| 1 | 0.5 bps/Hz | UE selects optimal PMI by reducing data efficiency per frequency by 0.5 bps/Hz for PMI = 1 |
| 2 | 1 bps/Hz | UE selects optimal PMI by reducing data efficiency per frequency by 1 bps/Hz for PMI = 2 |
| 3 | 2 bps/Hz | UE selects optimal PMI by reducing data efficiency per frequency by 2 bps/Hz for PMI = 3 |

The method of the fifth embodiment may be described as below in 1) through 5).

1) The eNB causes the UE to measure a CSI-RS and to report channel state information regarding the measured CSI-RS. Information configured for the UE by the eNB for CSI-RS measurement includes a PMI-specific rate_offset value (rate_offset0, rate_offset1, . . . , and rate_offsetK0−1 for K PMIs).

2) The UE calculates a maximum data efficiency per frequency that is supportable for each PMI.

3) The UE reduces each PMI-specific data efficiency per frequency by rate_offset.

4) The UE selects one optimal PMI from among the K PMIs based on results obtained in 3) according to a channel state report method set by the eNB.

5) The UE reports CSI regarding the PMI selected in 4) to the eNB. The UE also reports, to the eNB, PMI indicator information for notifying with which PMI among the K PMIs the channel state information is concerned.

Figure 12:
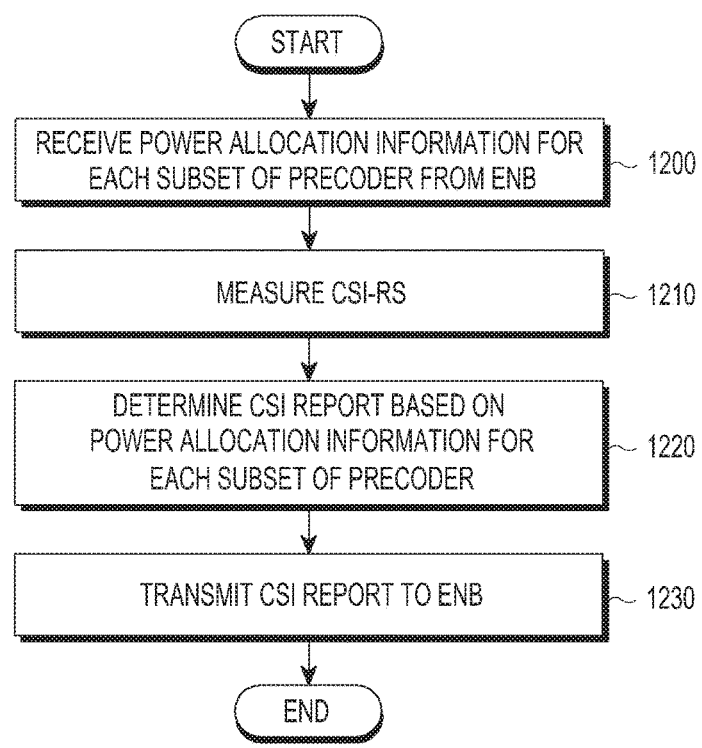
FIG. 12 is a flowchart illustrating an example of a method for reporting a channel status by a UE having received PMI-specific transmission power related information from an eNB according to an embodiment of the present disclosure.

FIG. 12 is a flowchart illustrating an example of a method for reporting a channel status by a UE having received PMI-specific transmission power related information from an eNB according to an embodiment of the present disclosure.

Referring to FIG. 12, in operation 1200, the UE receives transmission power related information from the eNB. The UE having received the transmission power related information receives a CSI-RS from the eNB to measure a channel state and determines a direction that is favorable to the UE based on the received transmission power related information in operation 1210. The UE determines a precoding matrix that is most useful to the UE based on the transmission power related information in operation 1220, and reports a PMI indicating the determined precoding matrix to the eNB in operation 1230.

Figure 13:
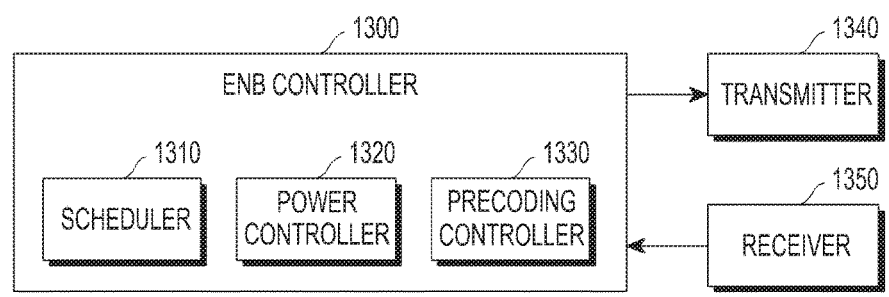
FIG. 13 is a block diagram of an example of a configuration of an eNB in a wireless communication system according to an embodiment of the present disclosure.

FIG. 13 is a block diagram of an example of a configuration of an eNB in a wireless communication system according to an embodiment of the present disclosure.

Referring to FIG. 13, the eNB may include an eNB controller 1300, a transmitter 1340, and a receiver 1350. The transmitter 1340 and the receiver 1350 may be implemented as a transceiver. Although not shown, the transceiver may include the above-described antenna array.

In FIG. 13, the eNB controller 1300 determines a transmission direction to be used for allocation of a transmission power, a transmission power to be allocated, and a way to notify transmission power allocation information to the UE. The eNB controller 1300 determines the transmission direction and the transmission power to be allocated and notifies the transmission power allocation information to the UE. The eNB controller 1300 may perform transmission power control by using at least one of the first through fifth embodiments. The eNB controller 1300 provides information described in the first through fifth embodiments to the UE through the transceiver.

The UE reports channel state information based on the transmission power allocation information notified by the eNB. A scheduler 1310 determines a UE to which downlink data transmission is to be performed based on channel state information reported by a plurality of UEs. This process is called scheduling. The eNB having determined a UE to which data transmission is to be performed through the scheduler 1310 determines a transmission power to be allocated to the UE and a transmission direction by using a power controller 1320 and a precoding controller 1330, and performs transmission based on the determined transmission power and transmission direction.

The eNB may be implemented by including a transceiver including an antenna array and a controller configured to transmit a reference signal at a plurality of different vertical angles through the antenna array, to receive channel state information which is related to beamforming of a transmission signal, from a UE having received the reference signal and measured a channel state, and to transmit the transmission signal to the UE with a transmission power corresponding to the channel state information.

Figure 14:
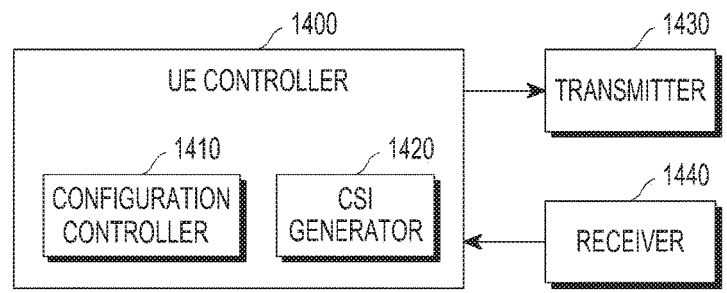
FIG. 14 is a block diagram of an example of a configuration of a UE in a wireless communication system according to an embodiment of the present disclosure.

FIG. 14 is a block diagram of an example of a configuration of a UE in a wireless communication system according to an embodiment of the present disclosure.

Referring to FIG. 14, the UE may include a controller 1400, a transmitter 1430, and a receiver 1440. The transmitter 1430 and the receiver 1440 may be implemented as a transceiver.

In FIG. 14, the UE controller 1400 receives transmission power allocation information indicating a transmission power the eNB is to allocate and a direction to be used for the allocation, determines channel state information, and reports the determined channel state information to the eNB. The UE controller 1400 may perform transmission power control by using at least one of the first through fifth embodiments. The UE controller 1400 receives the information described in the first through fifth embodiments from the eNB through the transceiver, and transmits the channel state information to the eNB.

A configuration controller 1410 of the UE identifies a power to be allocated in a certain direction when determining the channel state information based on the received transmission power allocation information, and manages related control configuration needed in the UE. A channel state information (CSI) generator 1420 selects channel state information (PMI, CQI, RI, etc.) that is optimal for the UE based on a transmission power to be allocated by the eNB for each direction and reports the selected optimal channel state information to the eNB through the transmitter 1430.

The UE may be implemented by including a transceiver for data transmission and reception and a controller configured to receive a reference signal at a plurality of different vertical angles through an antenna array of the eNB, to receive the reference signal and measure a channel state, to transmit channel state information which is related to beamforming of a transmission signal to be transmitted from the eNB, and to receive the transmission signal from the eNB with a transmission power corresponding to the channel state information.

The invention claimed is:

1. A transmission power control method performed by a base station of a wireless communication system using multiple antennas, the transmission power control method comprising:
    transmitting a plurality of reference signals (RS) per a plurality of different vertical angles through an antenna array;
    receiving, from a user equipment (UE), channel state information regarding at least one RS among the plurality of RSs; and
    transmitting a transmission signal to the UE at a vertical angle identified based on the channel state information, with a transmission power identified based on the vertical angle,
    wherein in a precoder codebook used by the base station in transmission of the transmission signal, a plurality of precoding matrices corresponding to the plurality of vertical angles are set.

2. The transmission power control method of claim 1, wherein the channel state information comprises a precoder matrix indicator (PMI) which corresponds to a vertical angle the UE prefers among the plurality of vertical angles.

3. The transmission power control method of claim 2, further comprising signaling, for the UE to report the channel state information, transmission power information for each PMI to the UE.

4. The transmission power control method of claim 2, further comprising signaling, for the UE to report the channel state information, information about a ratio of a transmission power of a data signal to a transmission power of a reference signal for each PMI.

5. The transmission power control method of claim 1, wherein in a precoder codebook where a plurality of precoding matrices corresponding to the plurality of vertical angles are set, each of the plurality of precoding matrices is applied with a different coefficient corresponding to an influence of interference.

6. The transmission power control method of claim 5, further comprising signaling information about the precoder codebook or the coefficient to the UE.

7. A base station of a wireless communication system using multiple antennas, the base station comprising:
    a transceiver comprising an antenna array; and
    a controller coupled with the transceiver and configured to:
        transmit a plurality of reference signals (RS) per a plurality of different vertical angles through the antenna array,
        receive, from a user equipment (UE), channel state information regarding at least one RS among the plurality of RSs, and
        transmit a transmission signal to the UE at a vertical angle identified based on the channel state information, with a transmission power identified based on the vertical angle,
    wherein in a precoder codebook used by the base station in transmission of the transmission signal, a plurality of precoding matrices corresponding to the plurality of vertical angles are set.

8. The base station of claim 7, wherein the channel state information comprises a precoder matrix indicator (PMI) which corresponds to a vertical angle the UE prefers among the plurality of vertical angles.

9. The base station of claim 8, further comprising signaling, for the UE to report the channel state information, transmission power information for each PMI to the UE.

10. The base station of claim 8, wherein the controller is further configured to transmit, for the UE to report the channel state information, information about a ratio of a transmission power of a data signal to a transmission power of a reference signal for each PMI to the UE.

11. The base station of claim 7, wherein in a precoder codebook where a plurality of precoding matrices corresponding to the plurality of vertical angles are set, each of the plurality of precoding matrices is applied with a different coefficient corresponding to an influence of interference.

12. The base station of claim 11, wherein the controller is further configured to transmit information about the precoder codebook or the coefficient to the UE.

13. A transmission power control method performed by a user equipment (UE) of a wireless communication system using multiple antennas, the transmission power control method comprising:
  receiving a plurality of reference signals (RS) transmitted per a plurality of different vertical angles through an antenna array of a base station;
  measuring a channel state and transmitting, to the base station, channel state information regarding at least one RS among the plurality of RSs;
  receiving, from the base station, a transmission signal transmitted at a vertical angle identified based on the channel state information, with a transmission power identified based on the vertical angle; and
  receiving, for the transmitting of the channel state information, transmission power information for each PMI from the base station.

14. The transmission power control method of claim 13, wherein the channel state information comprises a precoder matrix indicator (PMI) which corresponds to a vertical angle the UE prefers among the plurality of vertical angles.

15. The transmission power control method of claim 14, further comprising receiving, for the transmitting of the channel state information, information about a ratio of a transmission power of a data signal to a transmission power of a reference signal for each PMI from the base station.

16. A user equipment (UE) of a wireless communication system using multiple antennas, the UE comprising:
  a transceiver configured to transmit and receive data; and
  a controller coupled with the transceiver and configured to:
    receive a plurality of reference signals (RS) transmitted per a plurality of different vertical angles through an antenna array of a base station,
    measure a channel state, to transmit, to the base station, channel state information regarding at least one RS among the plurality of RSs,
    receive, from the base station, a transmission signal transmitted at a vertical angle identified based on the channel state information, with a transmission power identified based on the vertical angle, and
    receive, for transmitting the channel state information, information about a ratio of a transmission power of a data signal to a transmission power of a reference signal for each PMI from the base station.

17. The UE of claim 16, wherein the channel state information comprises a precoder matrix indicator (PMI) which corresponds to a vertical angle the UE prefers among the plurality of vertical angles.

18. The UE of claim 17, wherein the controller is further configured to receive, for transmitting the channel state information, information about a ratio of a transmission power of a data signal to a transmission power of a reference signal for each PMI from the base station.

* * * * *